US012333975B2

(12) United States Patent
Tanaka

(10) Patent No.: US 12,333,975 B2
(45) Date of Patent: Jun. 17, 2025

(54) DRIVER AND ELECTRO-OPTICAL DEVICE

(71) Applicant: SEIKO EPSON CORPORATION, Tokyo (JP)

(72) Inventor: Kazuaki Tanaka, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/804,742

(22) Filed: Aug. 14, 2024

(65) Prior Publication Data

US 2025/0061828 A1 Feb. 20, 2025

(30) Foreign Application Priority Data

Aug. 16, 2023 (JP) ................................ 2023-132464

(51) Int. Cl.
*G09G 3/18* (2006.01)

(52) U.S. Cl.
CPC ....... *G09G 3/18* (2013.01); *G09G 2320/0271* (2013.01); *G09G 2320/066* (2013.01); *G09G 2380/10* (2013.01)

(58) Field of Classification Search
None
See application file for complete search history.

(56) References Cited

U.S. PATENT DOCUMENTS

2009/0073327 A1* 3/2009 Watanabe ................ G09G 3/36 348/837
2017/0168659 A1* 6/2017 Nam ...................... B60K 35/00
2020/0184876 A1* 6/2020 Yamauchi ................ G09G 3/04
2021/0005129 A1* 1/2021 Kondo ................ G09G 3/2014

FOREIGN PATENT DOCUMENTS

JP 2016-78705 A 5/2016

* cited by examiner

*Primary Examiner* — Nicholas J Lee
(74) *Attorney, Agent, or Firm* — Rankin, Hill & Clark LLP

(57) ABSTRACT

A driver that drives a segment electrode group of a liquid crystal panel includes a first segment drive circuit that drives a first segment electrode for displaying a warning light in the segment electrode group, and a second segment drive circuit that drives a second segment electrode for displaying a display item other than the warning light in the segment electrode group. The first segment drive circuit outputs a first drive signal for displaying the warning light displayed by the first segment electrode with a higher contrast than the display item displayed by the second segment electrode driven by a second drive signal of the second segment drive circuit.

13 Claims, 12 Drawing Sheets

DRIVER AND ELECTRO-OPTICAL DEVICE

The present application is based on, and claims priority from JP Application Serial Number 2023-132464, filed Aug. 16, 2023, the disclosure of which is hereby incorporated by reference herein in its entirety.

BACKGROUND

1. Technical Field

The present disclosure relates to a driver and an electro-optical device, for example.

2. Related Art

JP-A-2016-78705 discloses a display device for a work vehicle such as a tractor. In the display device, a liquid crystal display device for displaying a vehicle speed, an engine rotation speed, and the like is provided at a central portion of a display surface, and warning lights are disposed on left and right sides of the central portion. When an abnormality or malfunction occurs, the warning light is turned on by light from a light emitting diode (LED) light source to notify a driver of the abnormality or malfunction.

However, in a method of displaying the warning lights using the LED light source provided separately from a backlight of the liquid crystal display device as disclosed in JP-A-2016-78705, a large number of LED elements are required to display various warning lights, leading to problems such as an increase in product cost.

SUMMARY

According to an aspect of the present disclosure, a driver that drives a segment electrode group of a liquid crystal panel includes: a first segment drive circuit that drives a first segment electrode for displaying a warning light in the segment electrode group; and a second segment drive circuit that drives a second segment electrode for displaying a display item other than the warning light in the segment electrode group, in which the first segment drive circuit outputs a first drive signal for displaying the warning light displayed by the first segment electrode with a higher contrast than the display item displayed by the second segment electrode driven by a second drive signal of the second segment drive circuit.

According to another aspect of the present disclosure, an electro-optical device includes: the driver described above; and the liquid crystal panel.

DESCRIPTION OF EMBODIMENTS

An exemplary embodiment of the present disclosure will be described in detail below. The present embodiment described below does not unduly limit the contents described in the claims, and not all of the configurations described in the present embodiment are necessarily essential components.

1. Example of Configuration of Driver

Figure 1:
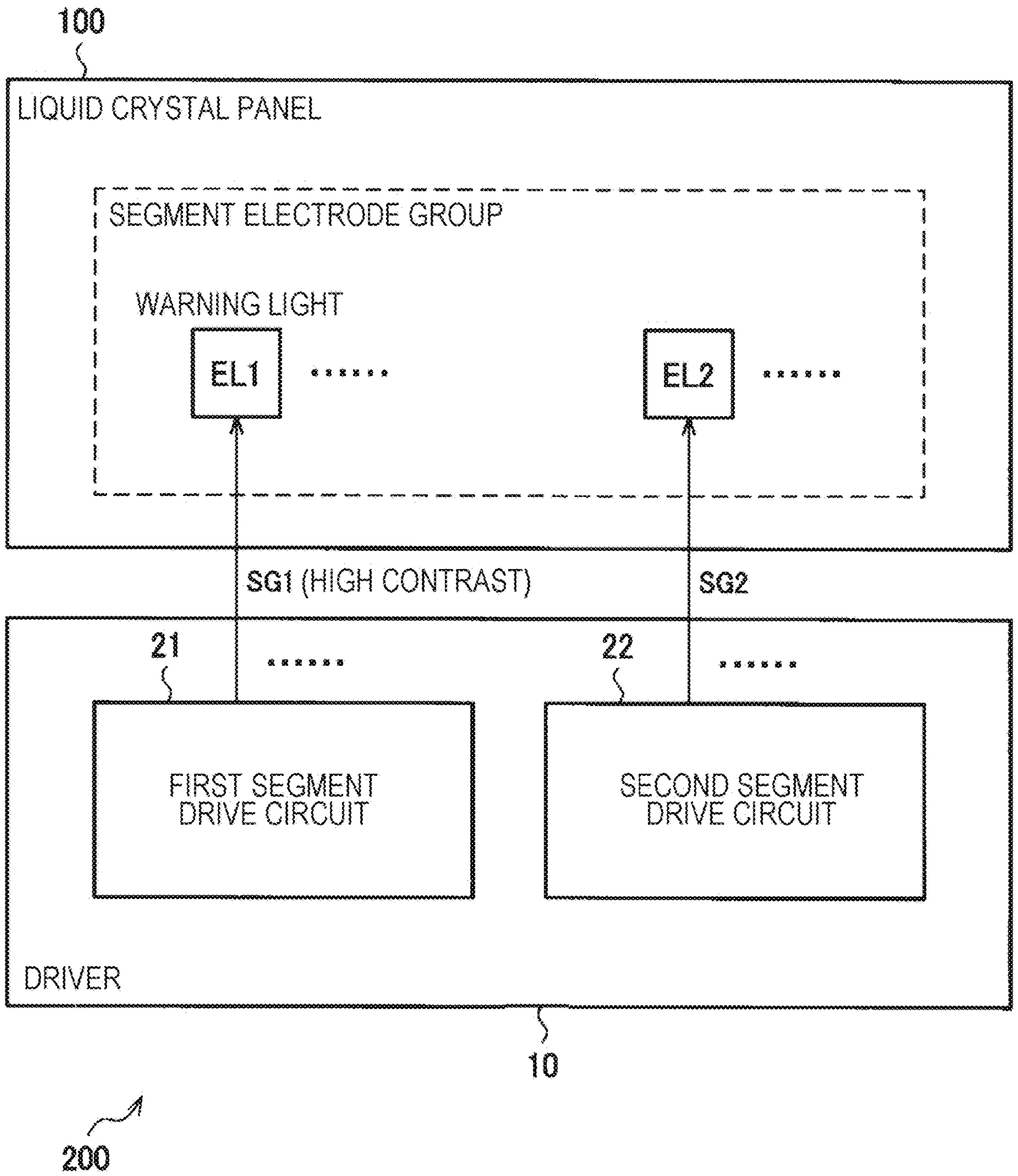
FIG. 1 illustrates an example of configurations of a driver and an electro-optical device of the present embodiment.

FIG. 1 illustrates an example of a configuration of a driver 10 of the present embodiment. The driver 10 includes a first segment drive circuit 21 and a second segment drive circuit 22. An electro-optical device 200 of the present embodiment includes the driver 10 and a liquid crystal panel 100. The electro-optical device 200 can further include a backlight described below.

The electro-optical device 200 is, for example, a display device that displays an image based on image data. The electro-optical device 200 is an in-vehicle display device such as a cluster display, which is a display of a meter panel, a center information display, a head-up display that displays a virtual image in a field of view of a user, or an electronic mirror. The in-vehicle display device is a display device mounted on a four-wheeled or two-wheeled automobile. Alternatively, the electro-optical device 200 may be a display device mounted on a mobile body other than a vehicle, such as a ship, a head-mounted display device called a head-mounted display (HMD), a television device, or a display of an information processing device.

The liquid crystal panel 100 is an electro-optical panel and is a display panel. The liquid crystal panel 100 is a panel driven by a static driving method, a duty driving method, or the like. Specifically, the liquid crystal panel 100 includes a first glass substrate, a second glass substrate, and liquid crystal. The liquid crystal is sealed between the first glass substrate and the second glass substrate. A segment electrode is provided on the first glass substrate, and a common electrode is provided on the second glass substrate. The driver 10 outputs a segment drive signal to the segment electrode. The driver 10 may also output a common drive signal to the common electrode. As a result, a voltage difference between the segment drive signal and the common drive signal is applied to the liquid crystal between the segment electrode and the common electrode. The segment electrode and the common electrode are transparent electrodes, for example, indium tin oxide (ITO) electrodes. The liquid crystal panel 100 also includes a backlight as described below. For example, an edge-light type backlight can be employed as the backlight. Specifically, the backlight includes a light source and a light guide plate, and light from the light source is guided by the light guide plate provided on a back side of the liquid crystal panel 100, for example.

The liquid crystal panel 100 includes a segment electrode group. The segment electrode group includes a first segment electrode EL1 for displaying a warning light, and a second segment electrode EL2 for displaying a display item other than the warning light. For example, the segment electrode group includes one or more first segment electrodes EL1 used to display the warning light, and one or more second segment electrodes EL2 used to display a display item other than the warning light.

Figure 2:
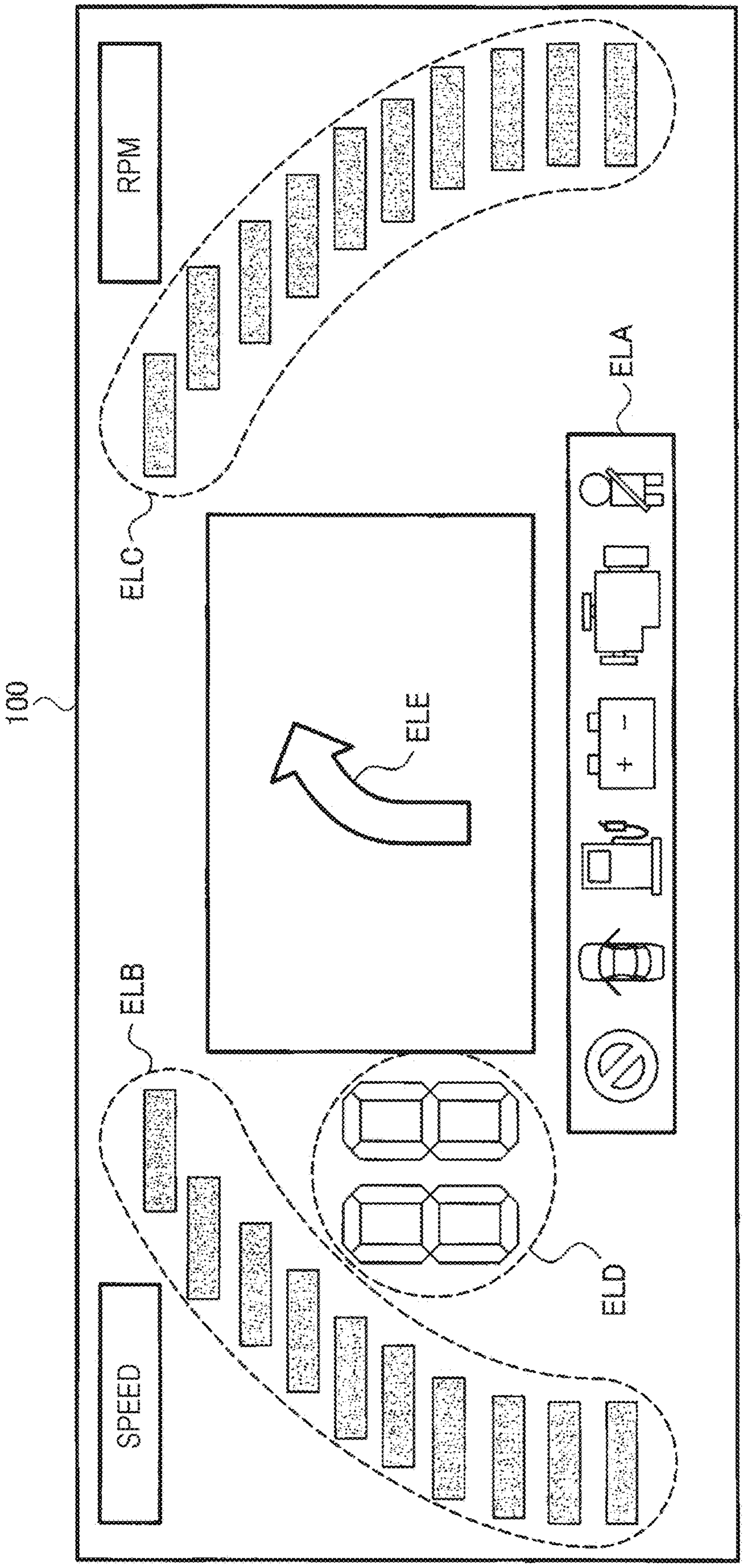
FIG. 2 illustrates an example of a segment electrode of a liquid crystal panel.

FIG. 2 illustrates an example of the segment electrode of the liquid crystal panel 100. FIG. 2 illustrates an example of the liquid crystal panel 100 used in a meter panel of an automobile. ELA in FIG. 2 is an example of the segment electrode of the warning light. The warning light is a display item that is turned on to warn the user when, for example, a malfunction or failure occurs in the automobile or the like, or when the user such as the driver performs an inappropriate operation. Specifically, ELA in FIG. 2 is the segment electrode for displaying the warning light related to fastening of a seat belt, an engine abnormality, a battery abnormality, remaining gasoline, or opening and closing of a door. The warning light is displayed as an icon, symbol, character, or the like representing a warning. Meanwhile, ELB, ELC, ELD, and ELE in FIG. 2 are segment electrodes for displaying display items other than the warning light. The display items other than the warning light are display items for conveying some kind of information to the user such as the driver through display modes such as on/off display or gradation display. For example, ELB is a segment electrode of a display item displaying a speed of the automobile, and ELC is a segment electrode of a display item displaying a revolutions per minute (RPM) of an engine. In ELB and ELC, for example, gradation display, in which a region representing speeds or RPMs up to the current speed or RPM is darker, and a region representing speeds or RPMs exceeding the current speed or RPM is lighter, is used. ELD is a segment electrode of an 8-segment display, and ELE is a segment electrode of a guide display item such as an arrow in simple navigation. The segment electrode of the warning light and the segment electrodes of the display items other than the warning light are not limited to the example illustrated in FIG. 2, and various shapes and forms of segment electrodes can be assumed.

The driver 10 is, for example, a circuit device called an integrated circuit (IC). For example, the driver 10 is an IC manufactured by a semiconductor process, a semiconductor chip with a circuit element formed on a semiconductor substrate, and a display driver that displays an image on the liquid crystal panel 100. The driver 10, which is a circuit device, is mounted on, for example, the glass substrate of the liquid crystal panel 100. For example, the driver 10 is mounted on the first glass substrate on which the segment electrode is provided. Alternatively, the driver 10 may be mounted on a circuit board, and the circuit board and the liquid crystal panel 100 may be coupled by a flexible substrate.

The driver 10 of the present embodiment, which drives the segment electrode group of the liquid crystal panel 100, includes the first segment drive circuit 21 and the second segment drive circuit 22. The driver 10 may include a data storage circuit and a common drive circuit as described below. In addition, although a case where two segment drive circuits, such as the first segment drive circuit 21 and the second segment drive circuit 22, are provided is mainly described as an example in the present embodiment, the present embodiment is not limited thereto, and three or more segment drive circuits may be provided.

The first segment drive circuit 21 drives the first segment electrode EL1 for displaying the warning light among the segment electrode group of the liquid crystal panel 100. For example, the first segment drive circuit 21 drives the first segment electrode EL1 by outputting a first drive signal SG1. The second segment drive circuit 22 drives the second segment electrode EL2 for displaying a display item other than the warning light among the segment electrodes of the liquid crystal panel 100. For example, the second segment drive circuit 22 drives the second segment electrode EL2 by outputting a second drive signal SG2. For example, a first terminal (not illustrated) for outputting the first drive signal SG1 from the first segment drive circuit 21 and a second terminal (not illustrated) for outputting the second drive signal SG2 from the second segment drive circuit 22 are provided in the driver 10. The first terminal is coupled to the first segment electrode EL1 of the liquid crystal panel 100, and the first drive signal SG1 from the first segment drive circuit 21 is output to the first segment electrode EL1 via the first terminal. The second terminal is coupled to the second segment electrode EL2 of the liquid crystal panel 100, and the second drive signal SG2 from the second segment drive circuit 22 is output to the second segment electrode EL2 via the second terminal. The first terminal and the second terminal are, for example, pads of the driver 10 which is a circuit device. For example, a metal layer is exposed from a passivation film, which is an insulating layer, in a pad region, and the pad, which is the terminal of the driver 10, is formed of the exposed metal layer. Note that the coupling in the present embodiment is electrical coupling. The electrical coupling is coupling that allows transmission of an electric signal, and is coupling that allows transmission of information by an electric signal. The electrical coupling may be made via a passive element or the like.

In the present embodiment, the first segment drive circuit 21 outputs the first drive signal SG1 for displaying the warning light displayed by the first segment electrode EL1 with a higher contrast than the display item displayed by the second segment electrode EL2 driven by the second drive signal SG2 of the second segment drive circuit 22. For example, the warning light displayed by the first segment electrode EL1 is driven in such a way as to have higher visibility than the display item displayed by the second segment electrode EL2. For example, the first segment drive circuit 21 drives the first segment electrode EL1 of the warning light in such a way that the first segment electrode EL1 for displaying the warning light described above as ELA in FIG. 2 is displayed with a higher contrast than the second segment electrode EL2 for displaying the display item other than the warning light. Here, the high contrast means, for example, a large brightness difference between a brightness when turned on and a brightness when turned off. For example, the first drive signal SG1 is output to make a brightness difference between a brightness when the warning light displayed by the first segment electrode EL1 is turned on and a brightness when the warning light is turned off be larger than a brightness difference between a brightness when the display item displayed by the second segment electrode EL2 is turned on and a brightness when the display item is turned off. For example, in the case of a normally white mode, the warning light or display item is displayed in black when turned on, and the warning light or display item is displayed in white when turned off. Therefore, in this case, driving is performed in such a way that a brightness difference between a brightness when the warning light is displayed in black and a brightness when the warning light is displayed in white is larger than a brightness difference between a brightness when the display item other than the warning light is displayed in black and a brightness when the display item other than the warning light is displayed in white. On the other hand, in the case of a normally black mode, the warning light or display item is displayed in white when turned on, and the warning light or display item is displayed in black when turned off. Therefore, in this case, driving is performed in such a way that a brightness difference between a brightness when the warning light is displayed in white and a brightness when the warning light is displayed in black is larger than a brightness difference between a brightness when the display item other than the warning light is displayed in white and a brightness when the display item other than the warning light is displayed in black. As described above, the warning light is displayed with a higher contrast than the other display items, so that the brightness difference between the brightness when turned on and the brightness when turned off becomes larger. Therefore, the visibility of the warning light can be improved. Turning on can also be referred to as on display, and turning off can also be referred to as off display.

For example, it is assumed that the second segment drive circuit 22 drives the second segment electrode EL2 by the duty driving method. In this case, the first segment drive circuit 21 drives the first segment electrode EL1 by the static driving method, so that the warning light displayed by the first segment electrode EL1 is displayed with a higher contrast than the display item displayed by the second segment electrode EL2. Alternatively, it is assumed that the second segment drive circuit 22 drives the second segment electrode EL2 by a pulse width modulation (PWM) or pulse amplitude modulation (PAM) segment drive method. In this case, the first segment drive circuit 21 drives the first segment electrode EL1 by the first drive signal SG1 having a pulse width larger than a pulse width (maximum pulse width) of PWM or a voltage amplitude higher than a voltage amplitude (maximum voltage amplitude) of PAM. As a result, the warning light displayed by the first segment electrode EL1 is displayed with a higher contrast than the display item displayed by the second segment electrode EL2. Further, as the warning light is displayed with a high contrast, it is possible to improve the visibility of the warning light.

Figure 3:
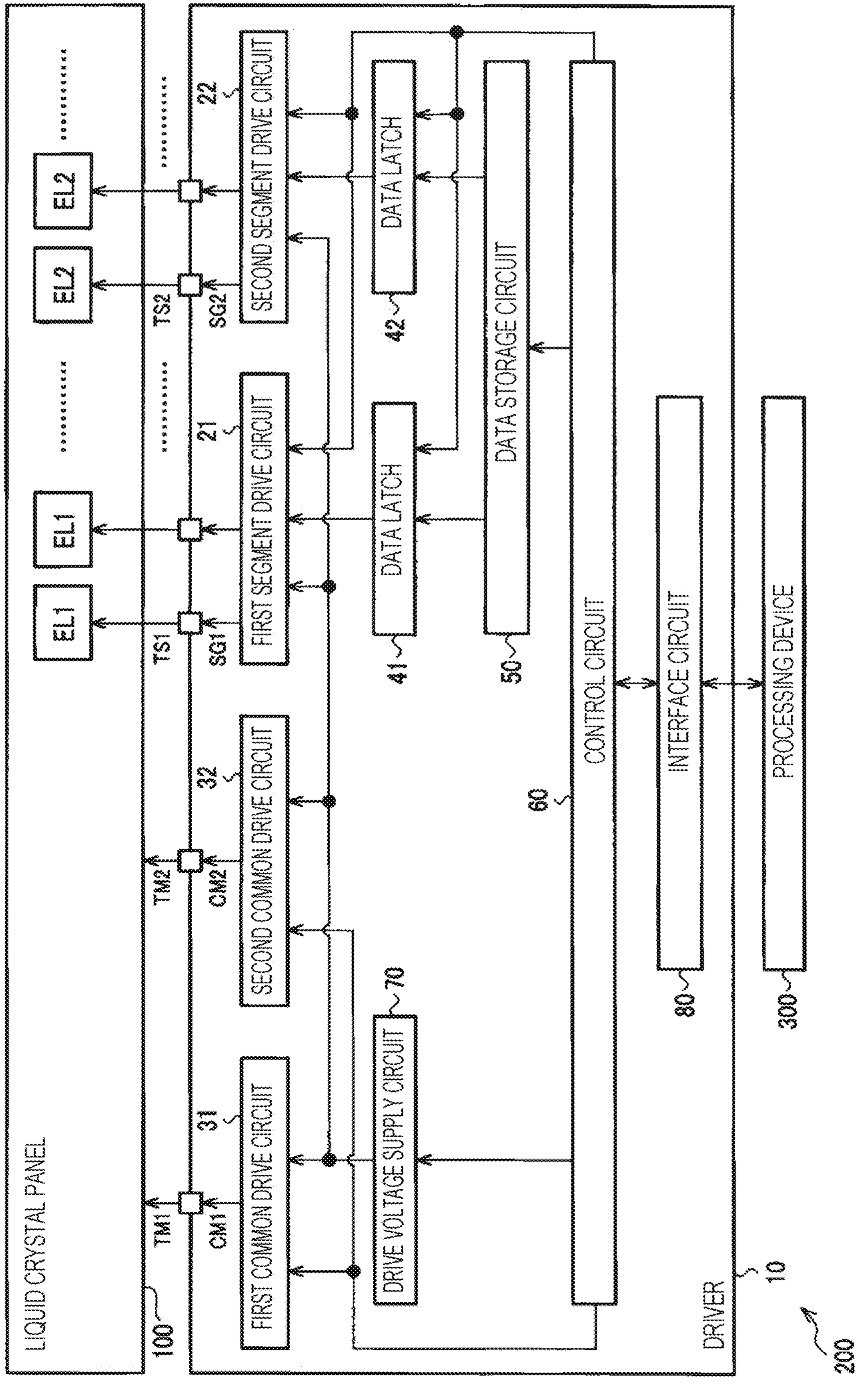
FIG. 3 illustrates an example of detailed configurations of the driver and the electro-optical device of the present embodiment.

FIG. 3 illustrates an example of detailed configurations of the driver 10 and the electro-optical device 200 of the present embodiment. In FIG. 3, the driver 10 includes the first segment drive circuit 21, the second segment drive circuit 22, a first common drive circuit 31, a second common drive circuit 32, data latches 41 and 42, a data storage circuit 50, and a control circuit 60. The driver 10 can further include a drive voltage supply circuit 70, an interface circuit 80, a first terminal TS1, a second terminal TS2, and common terminals TM1 and TM2. The driver 10 and the electro-optical device 200 are not limited to the configurations illustrated in FIG. 3, and various modifications such as omitting some of the components or adding other components are possible.

The first segment drive circuit 21 outputs the first drive signal SG1 to drive the first segment electrode EL1 for displaying the warning light. The second segment drive circuit 22 outputs the second drive signal SG2 to drive the second segment electrode EL2 for displaying the display item other than the warning light. As described above, the first segment drive circuit 21 outputs the first drive signal SG1 for displaying the warning light displayed by the first segment electrode EL1 with a higher contrast than the display item displayed by the second segment electrode EL2.

The first common drive circuit 31 drives a first common electrode corresponding to the first segment electrode EL1. For example, the first segment electrode EL1 and the first common electrode face each other. Specifically, the first common drive circuit 31 drives the first common electrode by outputting a common drive signal CM1 via the common terminal TM1. For example, the first drive signal SG1 is output to the first segment electrode EL1, and the common drive signal CM1 is output to the first common electrode, so that a voltage corresponding to a potential difference between SG1 and CM1 is applied to the liquid crystal between the first segment electrode EL1 and the first common electrode. As a result, the on/off display of the warning light corresponding to the first segment electrode EL1 is performed. Here, the on/off display is, for example, turning on or off the warning light. The second common drive circuit 32 drives a second common electrode corresponding to the second segment electrode EL2. For example, the second segment electrode EL2 and the second common electrode face each other. Specifically, the second common drive circuit 32 drives the second common electrode by outputting a common drive signal CM2 via the common terminal TM2. For example, the second drive signal SG2 is output to the second segment electrode EL2, and the common drive signal CM2 is output to the second common electrode, so that a voltage corresponding to a potential difference between SG2 and CM2 is applied to the liquid crystal between the second segment electrode EL2 and the second common electrode. As a result, the on/off display or gradation display of the display item such as an icon, number, character, or symbol corresponding to the second segment electrode EL2 is performed.

The first terminal TS1 and the second terminal TS2 are terminals for outputting the first drive signal SG1 and the second drive signal SG2, and are implemented by, for example, the pads of the driver 10. The common terminals TM1 and TM2 are terminals for outputting the common drive signals CM1 and CM2, and are implemented by, for example, the pads of the driver 10.

The drive voltage supply circuit 70 supplies a drive voltage, which is a drive power supply voltage for driving the liquid crystal panel 100, to the first segment drive circuit 21, the second segment drive circuit 22, the first common drive circuit 31, and the second common drive circuit 32. The first segment drive circuit 21 and the second segment drive circuit 22 generate and output the first drive signal SG1 and the second drive signal SG2, respectively, by selecting a segment electrode drive voltage based on display data, for example. The first common drive circuit 31 and the second common drive circuit 32 generate and output the common drive signals CM1 and CM2, respectively, by selecting a common electrode drive voltage under the control of the control circuit 60, for example. The common drive signals CM1 and CM2 are, for example, signals whose polarity is reversed every frame.

The data storage circuit 50 is a circuit that stores the display data, and can be implemented by a memory such as a random access memory (RAM). The data storage circuit 50 stores display data for the liquid crystal panel 100. Examples of the display data include on/off data or gradation data for display of the display item corresponding to the segment electrode. The display data is, for example, received from a processing device 300 via the interface circuit 80 and stored in the data storage circuit 50.

The data latches 41 and 42 latch the display data from the data storage circuit 50. The data latches 41 and 42, which are line latches or the like, latch the display data from the data storage circuit 50 based on a latch signal from the control circuit 60, for example. The first segment drive circuit 21 generates and outputs the first drive signal SG1 based on the data latched by the data latch 41. The second segment drive circuit 22 generates and outputs the second drive signal SG2 based on the data latched by the data latch 42. The data latches 41 and 42 are implemented by flip-flop circuits or the like.

The control circuit 60 is a logic circuit that operates based on a clock signal from an oscillator circuit (not illustrated), for example. The control circuit 40 can be implemented by an application specific integrated circuit (ASIC) using automatic place-and-route such as a gate array, or a processor such as a central processing unit (CPU). The control circuit 60 controls a display timing or performs setting of an operation of the driver 10 or the like. Specifically, the control circuit 60 writes the display data, various pieces of setting data, command data, and the like received by the interface circuit 80 to the data storage circuit 50 implemented by a RAM or the like.

The interface circuit 80 is a circuit that serves as an interface with the external processing device 300, and executes communication processing between the processing device 300 and the driver 10. For example, the interface circuit 80 receives various pieces of data such as the command data and the display data from the processing device 300. The interface circuit 80 can be implemented by a serial interface circuit such as an inter integrated circuit (I2C) or a serial peripheral interface (SPI) circuit.

The processing device 300 is, for example, a host device for the driver 10, and is implemented by, for example, a processor or a display controller. The processor is, for example, a CPU or a microcomputer. The processing device 300 may be a circuit device including a plurality of circuit components. For example, the processing device 300 may be an electronic control unit (ECU) in an in-vehicle electronic device.

As described above, the driver 10 of the present embodiment that drives the segment electrode group of the liquid crystal panel 100 includes the first segment drive circuit 21 that drives the first segment electrode EL1 for displaying the warning light, and the second segment drive circuit 22 that drives the second segment electrode EL2 for displaying the display item other than the warning light. The first segment drive circuit 21 outputs the first drive signal SG1 for displaying the warning light displayed by the first segment electrode EL1 with a higher contrast than the display item displayed by the second segment electrode EL2 driven by the second drive signal SG2 of the second segment drive circuit 22. In the present embodiment, the first segment drive circuit 21 that drives the first segment electrode EL1 for displaying the warning light and the second segment drive circuit 22 that drives the second segment electrode EL2 for displaying the display item other than the warning light are separately provided as described above. When the first segment drive circuit 21 for the warning light is provided in this manner, the warning light is displayed with a higher contrast than the display item other than the warning light by the first drive signal SG1 of the first segment drive circuit 21. As a result, it possible to ensure the visibility of the warning light even when the warning light is displayed using the liquid crystal panel 100. Therefore, it is possible to provide the driver 10 that can display the display item other than the warning light on the liquid crystal panel 100 and can display the warning light on the liquid crystal panel 100 with higher visibility than the display item.

For example, according to the related art of JP-A-2016-78705 described above, the warning lights lit by the light emitting diode (LED) light sources are provided on the left and right sides of the liquid crystal display device disposed at the central portion. However, in the method of JP-A-2016-78705, it is necessary to provide as many LED elements as the warning lights separately from the backlight of the liquid crystal display device, which leads to increased product costs and hinders miniaturization of the device. On the other hand, in the method of driving the segment electrode of the warning light and the segment electrode of the display item other than the warning light using the same segment drive circuit without separately providing the segment drive circuits as in the present embodiment, it is difficult to display the warning light with a high contrast and ensure the visibility. In addition, in the method of increasing the brightness of the backlight of the liquid crystal panel 100 to improve the visibility of the warning light, it is necessary to increase a current of the backlight to increase the brightness, which leads to an increase in current consumption of the system. In addition, since the backlight illuminates the entire liquid crystal panel 100 with a uniform brightness, the warning light and the other display items are displayed with the same contrast unless some special measures are taken. Therefore, there is a problem that it is not possible to increase the contrast of only the warning light while excluding the other display items in order to improve the visibility of the warning light.

In this regard, in the present embodiment, the first segment drive circuit 21 that drives the first segment electrode EL1 for displaying the warning light and the second segment drive circuit 22 that drives the second segment electrode EL2 for displaying the display item other than the warning light are separately provided. Therefore, by making a drive method for the first drive signal SG1 of the first segment drive circuit 21 different from a drive method for the second drive signal SG2 of the second segment drive circuit 22, the warning light corresponding to the first segment electrode EL1 can be displayed with a higher contrast than the display item corresponding to the second segment electrode EL2. Therefore, it is possible to display the warning light with high visibility by using the liquid crystal panel 100 without providing a separate LED light source for the warning light or unnecessarily increasing the current of the backlight.

2. Static Driving and Duty Driving

Figure 4:
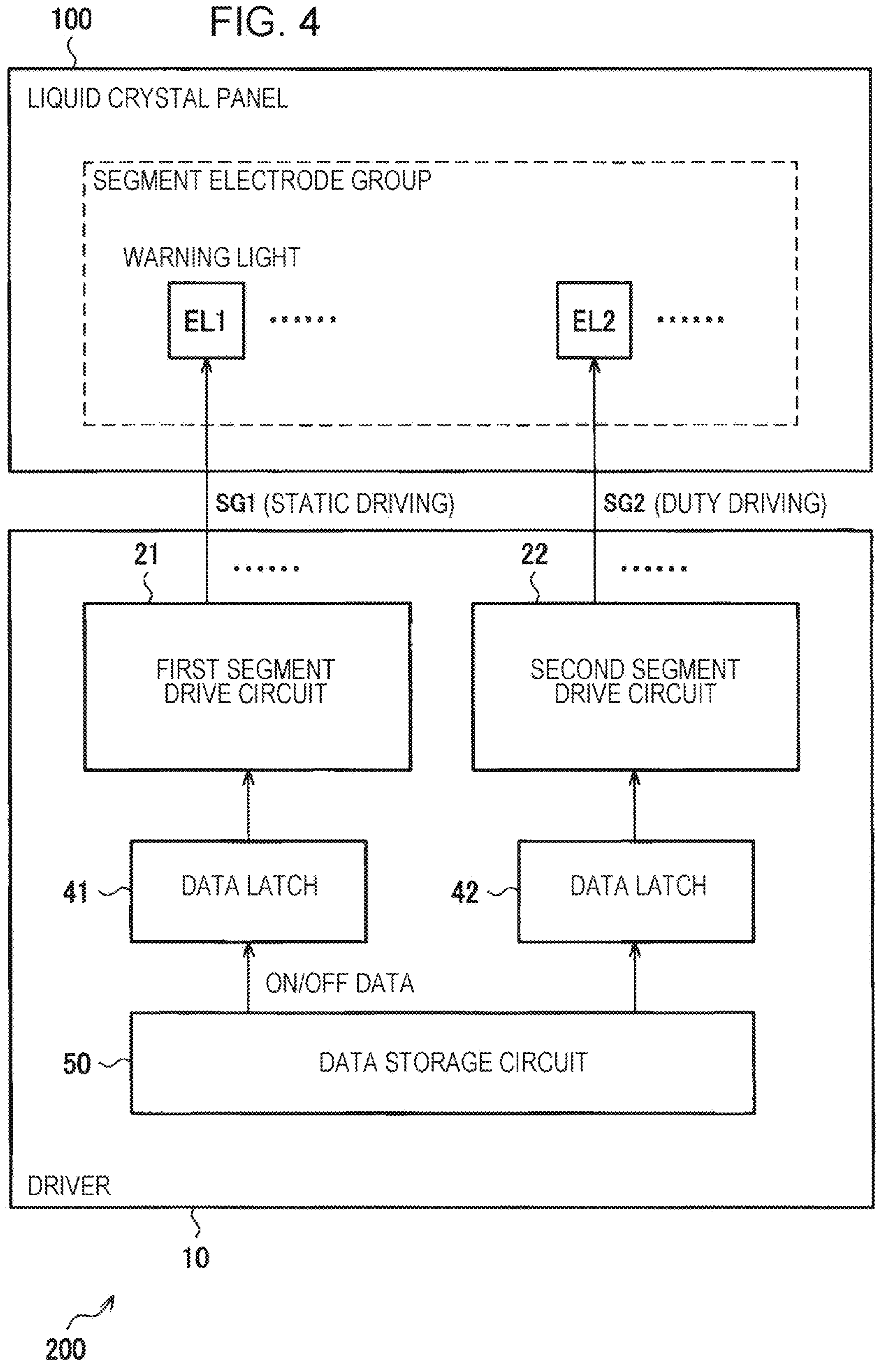
FIG. 4 illustrates an example of a configuration when a first segment drive circuit performs static driving and a second segment drive circuit performs duty driving.

Next, various methods for displaying the warning light with a high contrast will be described. As illustrated in FIG. 4, in the present embodiment, for example, the first segment drive circuit 21 drives the first segment electrode EL1 by using the first drive signal SG1 for static driving, and the second segment drive circuit 22 drives the second segment electrode EL2 by using the second drive signal SG2 for duty driving. By driving the first segment electrode EL1 using the first drive signal SG1 for the static driving in this way, the warning light corresponding to the first segment electrode EL1 can be displayed with a higher contrast than the display item corresponding to the second segment electrode EL2 driven by the second drive signal SG2 for the duty driving. Therefore, it is possible to implement the driver 10 that can display the warning light on the liquid crystal panel 100 with high visibility.

Here, the static driving method is, for example, a method of driving each segment electrode separately. For example, when a plurality of first segment electrodes EL1 corresponding to a plurality of warning lights are provided in the liquid crystal panel 100, the first segment drive circuit 21 outputs a plurality of first drive signals SG1 to be output to the plurality of first segment electrodes EL1. For example, in the liquid crystal panel 100, a plurality of segment lines coupled to the plurality of first segment electrodes EL1 are wired, and each of the plurality of first drive signals SG1 from the first segment drive circuit 21 is input to each of the plurality of segment lines to drive each of the plurality of first segment electrodes EL1. When the static driving in which each segment electrode is driven separately is performed, the brightness difference between the brightness when turned on (on display) and the brightness when turned off (off display) can be increased, so that the warning light can be displayed with a high contrast.

On the other hand, the duty driving method is a dynamic driving method, specifically a driving method called a simple matrix method. In the dynamic driving method, a plurality of segment electrodes are driven by the same drive signal. For example, the second segment drive circuit 22 outputs the common second drive signal SG2 to drive a plurality of second segment electrodes EL2 provided in the liquid crystal panel 100. For example, in the liquid crystal panel 100, a segment line commonly coupled to the plurality of second segment electrodes EL2 is wired, and the second drive signal SG2 from the second segment drive circuit 22 is input to the segment line commonly coupled to the plurality of second segment electrodes EL2. The duty driving performed by the second segment drive circuit 22 includes various types of duty driving such as ½, ⅓, ¼, ⅕, and ⅛. The duty driving method is, for example, a driving method using a voltage averaging method.

Figure 5:
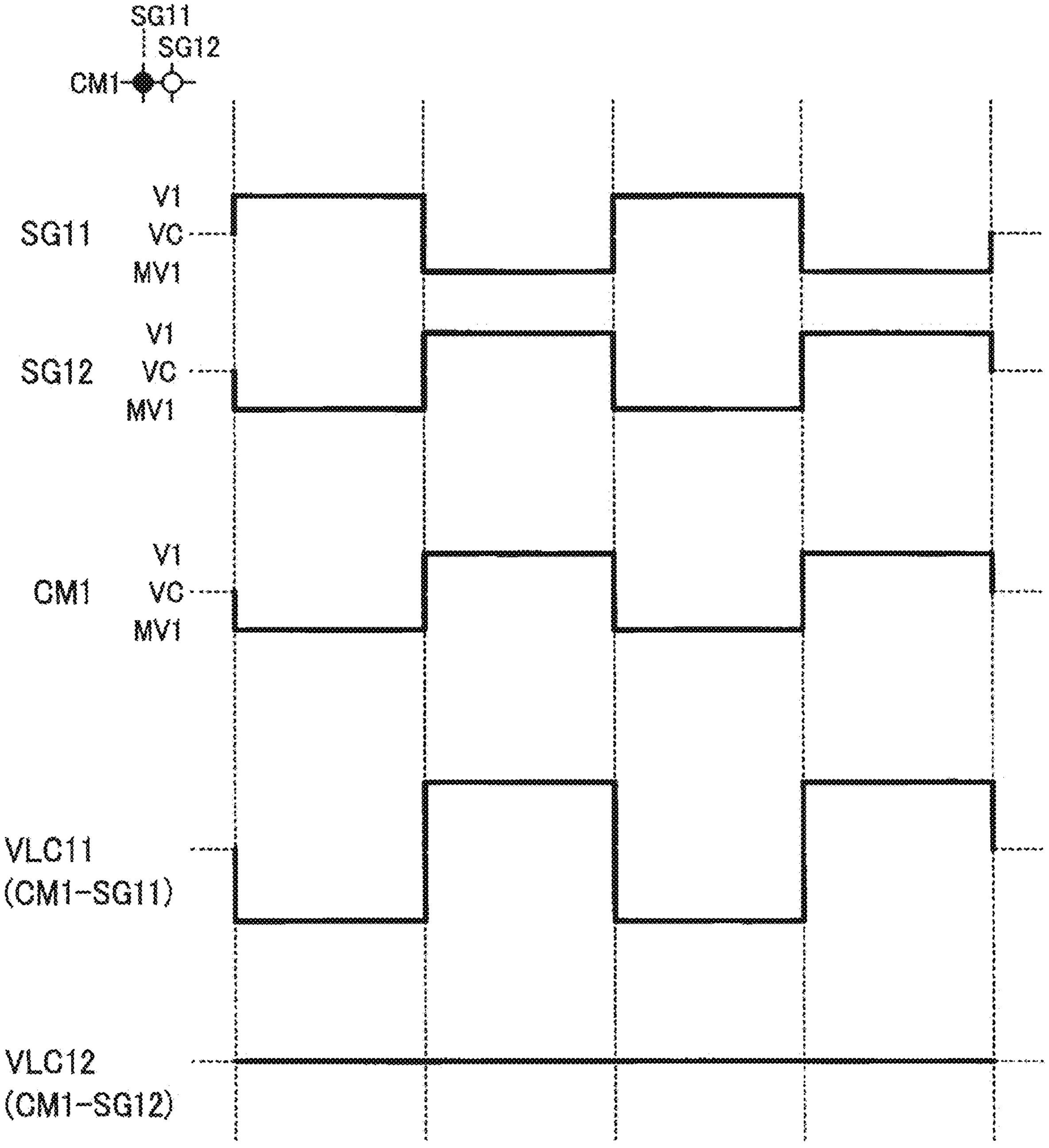
FIG. 5 illustrates an example of a signal waveform of the static driving of the first segment drive circuit.

FIG. 5 illustrates an example of a signal waveform of the static driving of the first segment drive circuit 21. FIG. 5 illustrates an example of a signal waveform when a first segment electrode EL11 to which a first drive signal SG11 and the common drive signal CM1 are applied is for display in black, and a first segment electrode EL12 to which a first drive signal SG12 and the common drive signal CM1 are applied is for display in white. The following description will be given taking the case of the normally white mode as an example. Further, the reference signs of the segment electrodes such as EL11 and EL12 will be omitted below.

The first segment drive circuit 21 that performs the static driving outputs the first drive signals SG11 and SG12 as illustrated in FIG. 5 to the first segment electrodes EL11 and EL12, respectively, and the first common drive circuit 31 outputs the common drive signal CM1 to common electrodes corresponding to EL11 and EL12. Therefore, a voltage signal VLC11 corresponding to a voltage difference between SG11 and CM1 is applied to the liquid crystal between the first segment electrode EL11 and the corresponding common electrode. Further, a voltage signal VLC12 corresponding to a voltage difference between SG12 and CM1 is applied to the liquid crystal between the first segment electrode EL12 and the corresponding common electrode. Since the case of the normally white mode is assumed here, the voltage signal VLC11 with a high effective voltage is applied to the liquid crystal in the first segment electrode EL11, and thus, a warning light corresponding to the first segment electrode EL11 is displayed black, which indicates a turned-on state. On the other hand, a warning light corresponding to the first segment electrode EL12 is displayed in white, which indicates a turned-off state.

Figure 6:
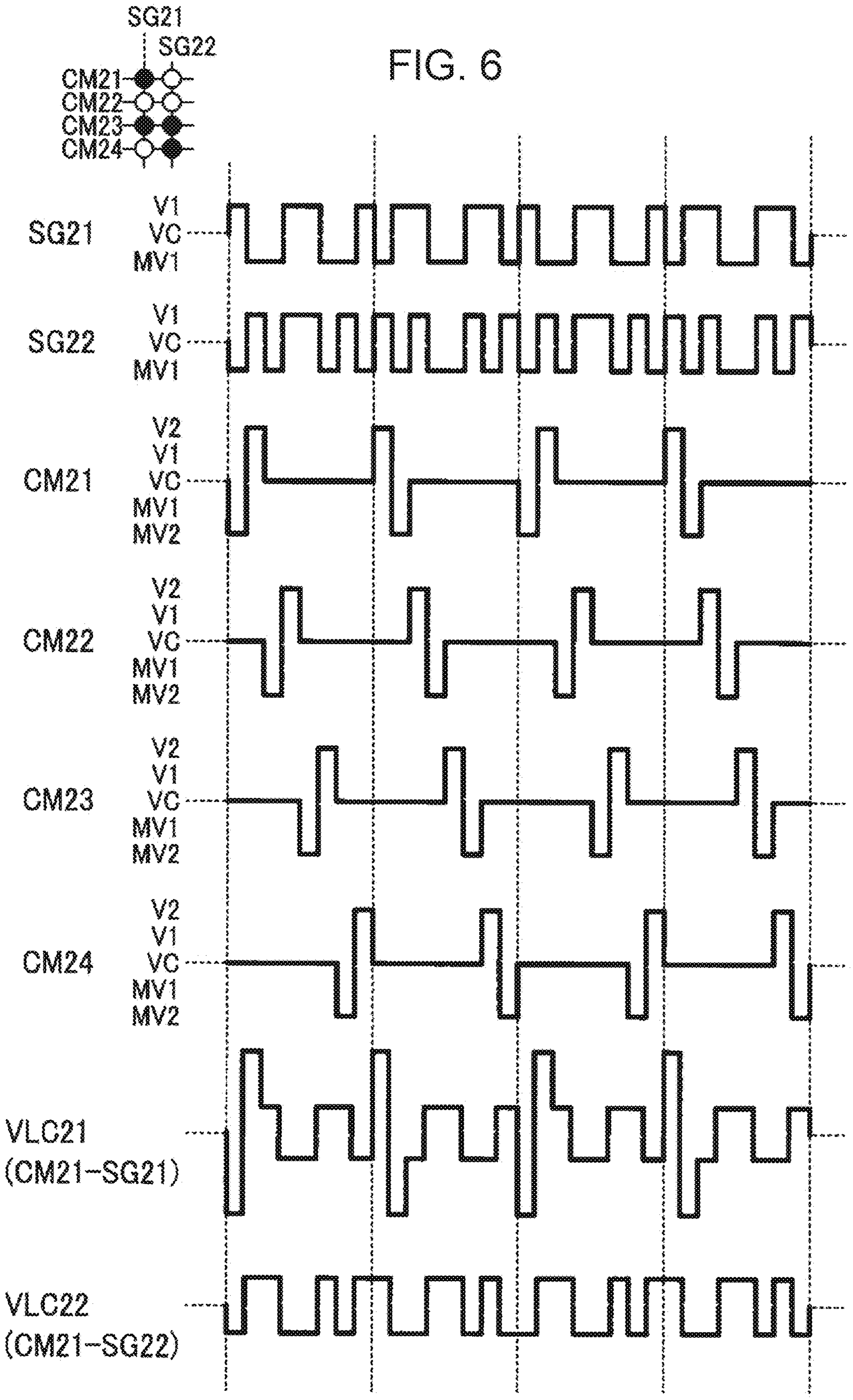
FIG. 6 illustrates an example of a signal waveform of the duty driving of the second segment drive circuit.

FIG. 6 illustrates an example of a signal waveform of the duty driving of the second segment drive circuit 22. FIG. 6 illustrates an example of ¼ duty driving, in which display using eight second segment electrodes is performed using two segment lines corresponding to second drive signals SG21 and SG22 and four common lines corresponding to common drive signals CM21, CM22, CM23, and CM24. For example, in FIG. 6, one frame is divided into four subfields, and in each of the four subfields, the common drive signals CM21, CM22, CM23, and CM24 become selected signals in sequence. Here, the uppermost left segment electrode driven by SG21 and CM21 is referred to as a second segment electrode EL21, and a segment electrode immediately to the right of EL21 is referred to as a second segment electrode EL22. FIG. 6 illustrates an example of a signal waveform when the uppermost left second segment electrode EL21 to which the second drive signal SG21 and the common drive signal CM21 are applied is for display in black, and the second segment electrode EL22 which is positioned to the right of EL21 and to which the second drive signal SG22 and the common drive signal CM21 are applied is for display in white.

The second segment drive circuit 22 that performs the duty driving outputs the second drive signals SG21 and SG22 as illustrated in FIG. 6 to the second segment electrodes EL21 and EL22, respectively, and the second common drive circuit 32 outputs the common drive signal CM21 to common electrodes corresponding to EL21 and EL22. V1, V2, VC, MV1, and MV2 in FIG. 6 indicate drive voltages supplied by the drive voltage supply circuit 70 of FIG. 3. Therefore, a voltage signal VLC21 corresponding to a voltage difference between SG21 and CM21 is applied to the liquid crystal between the second segment electrode EL21 and the corresponding common electrode. Further, a voltage signal VLC22 corresponding to a voltage difference between SG22 and CM21 is applied to the liquid crystal between the second segment electrode EL22 and the corresponding common electrode. Then, when the voltage signal VLC21 with a higher effective voltage than VLC22 is applied to the liquid crystal in the second segment electrode EL21, a display item corresponding to the second segment electrode EL21 is displayed in black, which indicates a turned-on state. On the other hand, a display item corresponding to the second segment electrode EL22 is displayed in white, which indicates a turned-off state.

In the static driving of FIG. 5, an effective voltage difference between the effective voltage (VLC11) applied to the liquid crystal of the first segment electrode EL11 in the turned-on state and the effective voltage (VLC12) applied to the liquid crystal of the first segment electrode EL12 in the turned-off state is large. On the other hand, in the duty driving of FIG. 6, an effective voltage difference between the effective voltage (VLC21) applied to the liquid crystal of the second segment electrode EL21 in the turned-on state and the effective voltage (VLC22) applied to the liquid crystal of the second segment electrode EL22 in the turned-off state is smaller than that in the static driving of FIG. 5. Therefore, as the first segment drive circuit 21 performs the static driving for the first segment electrodes EL11 and EL12 as illustrated in FIG. 5, the effective voltage difference between the turned-on state and the turned-off state can be larger than that in the duty driving as illustrated in FIG. 6, and the warning lights corresponding to the first segment electrodes EL11 and EL12 can be displayed with a high contrast. For example, a brightness difference between a brightness when the liquid crystal is in a non-transparent state and the warning light is displayed in black and a brightness when the liquid crystal is in a transparent state and the warning light is displayed in white can correspond to the maximum brightness of the backlight, so that the warning light can be displayed with a high contrast. On the other hand, when the second segment electrodes EL21 and EL22 for the display items other than the warning light are driven by the duty driving as illustrated in FIG. 6, the number of segment lines can be smaller than that of the static driving, which has an advantage of making it possible to reduce a wiring region for the segments on the liquid crystal panel 100 and to facilitate wiring of the segment lines.

As described above, in FIGS. 4, 5 and 6, the first segment drive circuit 21 drives the first segment electrode EL1 (EL11 and EL12) by using the first drive signal SG1 (SG11 and SG12) for the static driving, and the second segment drive circuit 22 drives the second segment electrode EL2 (EL21 and EL22) by using the second drive signal SG2 (SG21 and SG22) for the duty driving. As a result, the warning light corresponding to the first segment electrode EL1 can be displayed with a high contrast. In addition, the duty driving is performed for the second segment electrode EL2 for the display item other than the warning light, which has an advantage of making it possible to reduce the number of segment lines in the liquid crystal panel 100 and facilitate the wiring of the segment lines.

In FIG. 4, the first segment drive circuit 21 outputs the first drive signal SG1 for turning on or off the warning light to the first segment electrode EL1 based on the on/off data of the warning light. For example, the data storage circuit 50 stores the on/off data of the warning light, and the on/off data is read from the data storage circuit 50 and input to the first segment drive circuit 21 via, for example, the data latch 41. When the on/off data of the warning light indicates the on display, the first segment drive circuit 21 outputs the first drive signal SG1 for turning on the warning light to the first segment electrode EL1. For example, the first segment drive circuit 21 outputs the first drive signal SG11 as illustrated in FIG. 5 to the first segment electrode EL11. On the other hand, when the on/off data of the warning light indicates the off display, the first drive signal SG1 for turning off the warning light is output to the first segment electrode EL1. For example, the first segment drive circuit 21 outputs the first drive signal SG12 as illustrated in FIG. 5 to the first segment electrode EL12. In this case, the first segment drive circuit 21 can output the first drive signal SG1 for turning on or off the warning light to the first segment electrode EL1 based on the on/off data of the warning light. Since the first segment drive circuit 21 outputs the first drive signal SG1 for the static driving, it is possible to increase a difference between the effective voltage of the liquid crystal when the warning light is turned on based on the on/off data and the effective voltage of the liquid crystal when the warning light is turned off, and it is possible to display the warning light with a high contrast.

The driver 10 of the present embodiment further includes the first common drive circuit 31 that drives the first common electrode corresponding to the first segment electrode EL1, and the second common drive circuit 32 that drives the second common electrode corresponding to the second segment electrode EL2 as illustrated in FIG. 3. In this case, even when the driving method for the first segment electrode EL1 and the driving method for the second segment electrode EL2 are different from each other, for example, when the driving method for the first segment electrode EL1 is the static driving method, and the driving method for the second segment electrode EL2 is the duty driving method as described above, the first common drive circuit 31 and the second common drive circuit 32 can output the common drive signals CM1 and CM2 appropriate for the respective driving methods. Therefore, by using different driving methods for the first segment electrode EL1 and the second segment electrode EL2, it is possible to display the warning light corresponding to the first segment electrode EL1 with a high contrast, while driving the first common electrode and the second common electrode using appropriate common drive signals according to each driving method.

3. Static Driving by PWM and PAM

Figure 7:
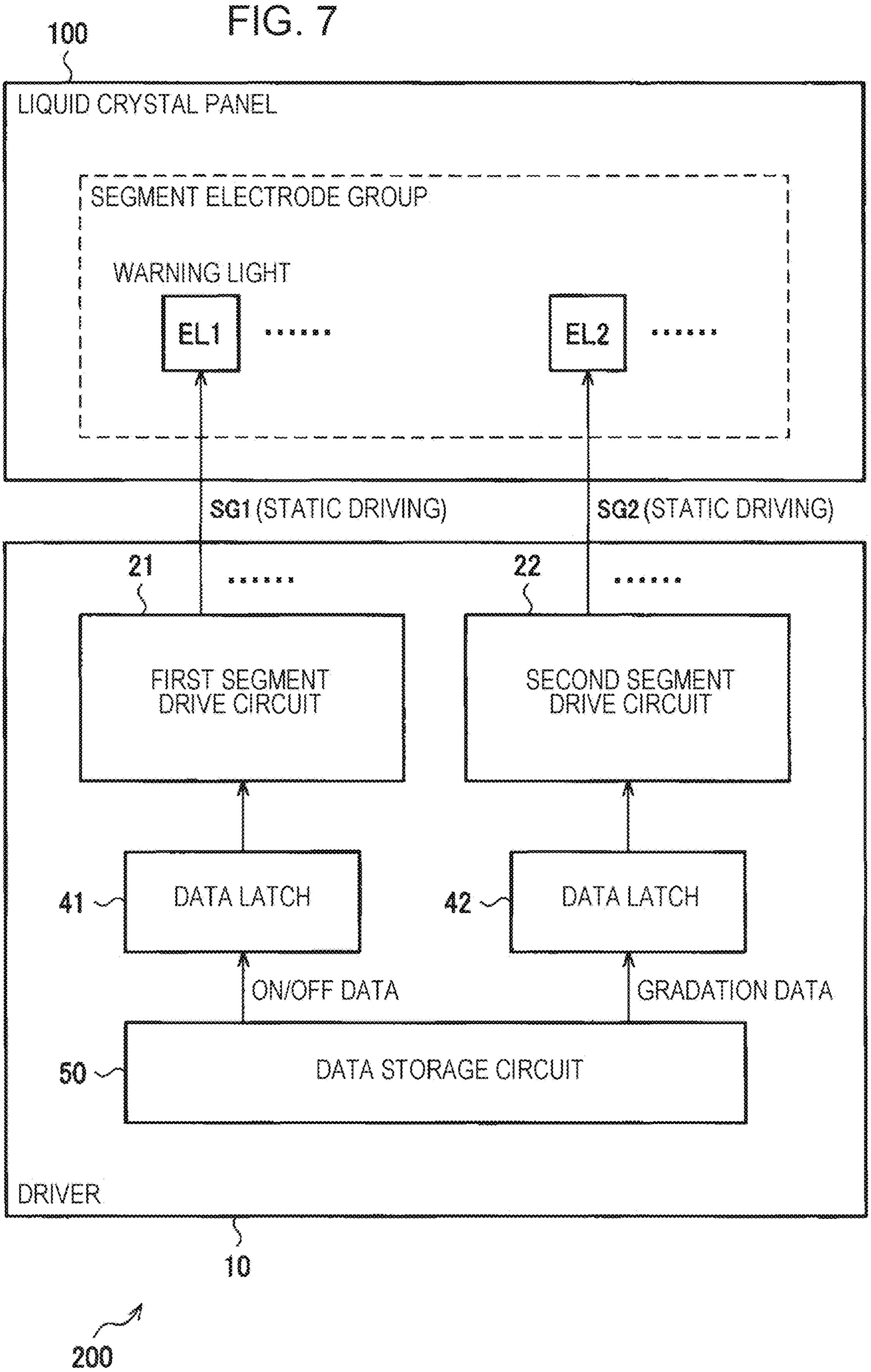
FIG. 7 illustrates an example of a configuration when the first segment drive circuit performs the static driving and the second segment drive circuit performs the static driving.

In FIG. 7, the first segment drive circuit 21 drives the first segment electrode EL1 by using the first drive signal SG1 for the static driving, and the second segment drive circuit 22 drives the second segment electrode EL2 by using the second drive signal SG2 for the static driving. That is, in FIG. 4, the first segment drive circuit 21 performs the static driving and the second segment drive circuit 22 performs the duty driving, but in FIG. 7, both the first segment drive circuit 21 and the second segment drive circuit 22 perform the static driving.

Further, in FIG. 7, the first segment drive circuit 21 outputs the first drive signal SG1 for turning on or off the warning light to the first segment electrode EL1 based on the on/off data of the warning light. For example, the on/off data of the warning light is read from the data storage circuit 50 and input to the first segment drive circuit 21 via the data latch 41. When the on/off data of the warning light indicates the on display, the first segment drive circuit 21 outputs the first drive signal SG1 for turning on the warning light to the first segment electrode EL1. When the on/off data of the warning light indicates the off display, the first segment drive circuit 21 outputs the first drive signal SG1 for turning off the warning light to the first segment electrode EL1.

Meanwhile, the second segment drive circuit 22 outputs the second drive signal SG2 to the second segment electrode EL2 to perform the gradation display of the display item based on the gradation data of the display item. For example, the gradation data of the display item is read from the data storage circuit 50 and input to the second segment drive circuit 22 via the data latch 42. The second segment drive circuit 22 then outputs the second drive signal SG2 according to the gradation data to the second segment electrode EL2 to perform the gradation display of the display item corresponding to the second segment electrode EL2. For example, the second segment drive circuit 22 performs the gradation display of the display item corresponding to the second segment electrode EL2 by generating a PWM signal or a PAM signal based on the gradation data. In this case, for the warning light, the static driving for the first segment electrode EL1 is performed using the first drive signal SG1 based on the on/off data of the warning light, so that the warning light can be displayed with a high contrast. On the other hand, for the display item other than the warning light, the static driving for the second segment electrode EL2 is performed using the second drive signal SG2 based on the gradation data, so that the gradation display of the display item can be performed.

For example, the second segment drive circuit 22 performs the gradation display of the display item displayed by the second segment electrode EL2 by using the second drive signal SG2 that is the PWM signal. For example, the second segment drive circuit 22 outputs the second drive signal SG2, that is the PWM signal whose pulse width (duty ratio) changes according to the gradation data, to the second segment electrode EL2, thereby implementing the gradation display of the display item. In this case, for the warning light, the static driving based on the on/off data of the warning light can be performed to display the warning light with a high contrast, and for the display item other than the warning light, the static driving using the PWM signal based on the gradation data can be performed to implement the gradation display of the display item.

Figure 8:
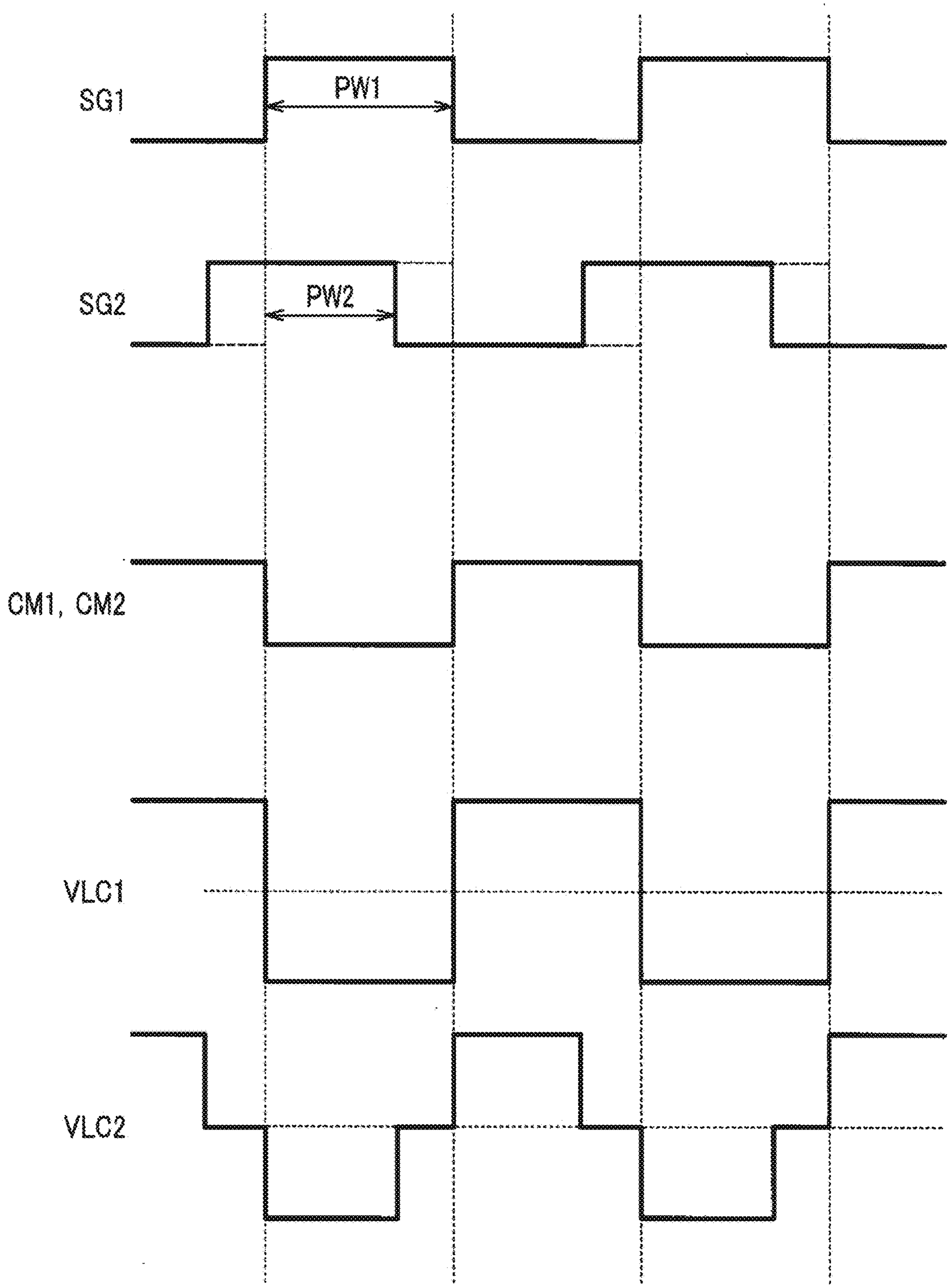
FIG. 8 illustrates an example of a signal waveform of the static driving using a pulse width modulation (PWM) signal.

FIG. 8 illustrates an example of a signal waveform of the static driving using the PWM signal. The first segment drive circuit 21 outputs the first drive signal SG1 with a pulse width PW1 as illustrated in FIG. 8 to the first segment electrode EL1 based on the on/off data of the warning light. The first common drive circuit 31 outputs the common drive signal CM1 as illustrated in FIG. 8. The first drive signal SG1 in FIG. 8 has a signal waveform when the on/off data of the warning light indicates the on display and the warning light is turned on. As a result, a voltage signal VLC1 corresponding to a voltage difference between the first drive signal SG1 and the common drive signal CM1 is applied to the liquid crystal between the first segment electrode EL1 and the corresponding common electrode. An effective voltage applied to the liquid crystal by the voltage signal VLC1 is high, and thus, the warning light can be displayed with a high contrast.

On the other hand, the second segment drive circuit 22 outputs the second drive signal SG2 with a pulse width PW2 as illustrated in FIG. 8 to the second segment electrode EL2 based on the gradation data of the display item. The second common drive circuit 32 outputs the common drive signal CM2 as illustrated in FIG. 8. A pulse width PW2 of the second drive signal SG2 in FIG. 8 is set according to the gradation data. For example, PWM of the second drive signal SG2 is performed in such a way that the pulse width PW2 becomes large when a gradation value of the gradation data is high, and the pulse width PW2 becomes small when the gradation value of the gradation data is low. In terms of the duty ratio, for example, PWM is performed in such a way that the duty ratio changes in a range of 0 to X %. As a result, a voltage signal VLC2 corresponding to a voltage difference between the second drive signal SG2 and the common drive signal CM2 is applied to the liquid crystal between the second segment electrode EL2 and the corresponding common electrode. An effective voltage of the voltage signal VLC2 changes according to the pulse width PW2, and thus, the gradation display of the display item based on the gradation data can be performed. That is, the duty ratio of the second drive signal SG2 is set based on the gradation data, and thus, the gradation display of the display item can be performed.

The pulse width PW1 of the first drive signal SG1 is larger than the pulse width PW2 of the second drive signal SG2 that is the PWM signal. For example, the pulse width PW2 is variably set according to the gradation data, and the pulse width PW1 of the first drive signal SG1 is larger than the variably set pulse width PW2 of the second drive signal SG2. For example, a duty ratio of the first drive signal SG1 is higher than X %. Therefore, the effective voltage applied to the liquid crystal of the first segment electrode EL1 is higher than the effective voltage applied to the liquid crystal of the second segment electrode EL2, and thus, it is possible to display the warning light corresponding to the first segment electrode EL1 with a higher contrast than the display item corresponding to the second segment electrode EL2. A modification in which the duty ratio of the first drive signal SG1 is X % is also possible.

Alternatively, the second segment drive circuit 22 performs the gradation display of the display item displayed by the second segment electrode EL2 by using the second drive signal SG2 that is the PAM signal. For example, the second segment drive circuit 22 outputs the second drive signal SG2, that is the PAM signal whose voltage amplitude changes according to the gradation data, to the second segment electrode EL2, thereby implementing the gradation display of the display item. In this case, for the warning light, the static driving based on the on/off data of the warning light can be performed to display the warning light with a high contrast, and for the display item other than the warning light, the static driving using the PAM signal based on the gradation data can be performed to implement the gradation display of the display item.

Figure 9:
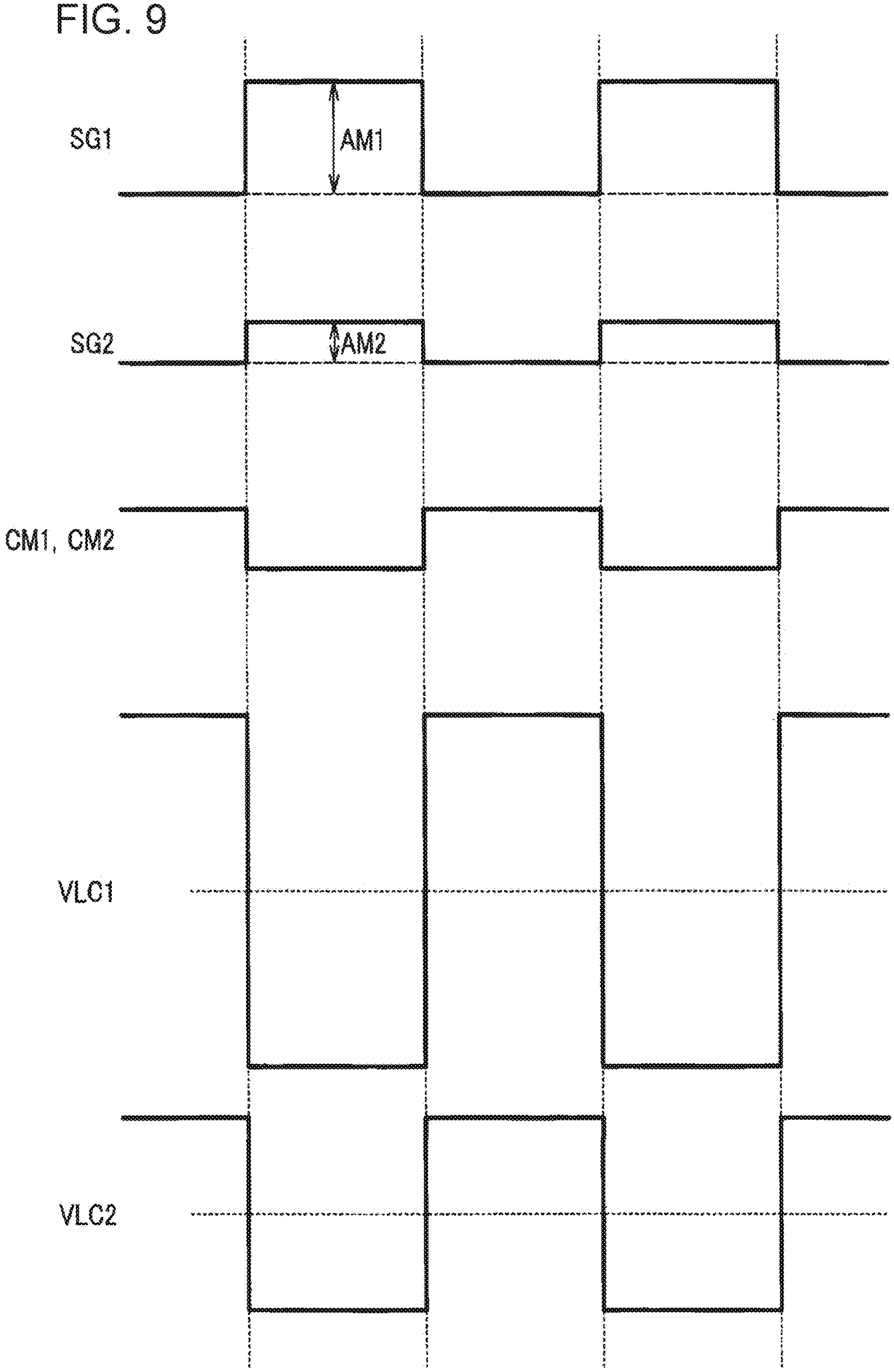
FIG. 9 illustrates an example of a signal waveform of the static driving using a pulse amplitude modulation (PAM) signal.

FIG. 9 illustrates an example of a signal waveform of the static driving using the PAM signal. The first segment drive circuit 21 outputs the first drive signal SG1 with a voltage amplitude AM1 as illustrated in FIG. 9 to the first segment electrode EL1 based on the on/off data of the warning light. The first common drive circuit 31 outputs the common drive signal CM1 as illustrated in FIG. 9. The first drive signal SG1 in FIG. 9 has a signal waveform when the on/off data of the warning light indicates the on display and the warning light is turned on. As a result, the voltage signal VLC1 corresponding to the voltage difference between the first drive signal SG1 and the common drive signal CM1 is applied to the liquid crystal between the first segment electrode EL1 and the corresponding common electrode. The effective voltage applied to the liquid crystal by the voltage signal VLC1 is high, and thus, the warning light can be displayed with a high contrast.

On the other hand, the second segment drive circuit 22 outputs the second drive signal SG2 with a voltage amplitude AM2 as illustrated in FIG. 9 to the second segment electrode EL2 based on the gradation data of the display item. The second common drive circuit 32 outputs the common drive signal CM2 as illustrated in FIG. 9. The voltage amplitude AM2 of the second drive signal SG2 in FIG. 9 is set according to the gradation data. For example, PAM of the second drive signal SG2 is performed in such a way that the voltage amplitude AM2 becomes high when the gradation value of the gradation data is high, and the voltage amplitude AM2 becomes small when the gradation value of the gradation data is low. As a result, the voltage signal VLC2 corresponding to the voltage difference between the second drive signal SG2 and the common drive signal CM2 is applied to the liquid crystal between the second segment electrode EL2 and the corresponding common electrode. The effective voltage of the voltage signal VLC2 changes according to the voltage amplitude AM2, and thus, the gradation display of the display item based on the gradation data can be performed.

The voltage amplitude AM1 of the first drive signal SG1 is higher than the voltage amplitude AM2 of the second drive signal SG2 that is the PAM signal. For example, the voltage amplitude AM2 is variably set according to the gradation data, and the voltage amplitude AM1 of the first drive signal SG1 is higher than the variably set voltage amplitude AM2 of the second drive signal SG2. Therefore, the effective voltage applied to the liquid crystal of the first segment electrode EL1 is higher than the effective voltage applied to the liquid crystal of the second segment electrode EL2, and thus, it is possible to display the warning light corresponding to the first segment electrode EL1 with a higher contrast than the display item corresponding to the second segment electrode EL2. It is not necessary to perform the gradation display for all the display items other than the warning light by using PWM signal or PAM signal, and the pulse width or voltage amplitude may be fixed for some display items other than the warning light, or only the on/off display may be performed for some display items other than the warning light.

Figure 10:
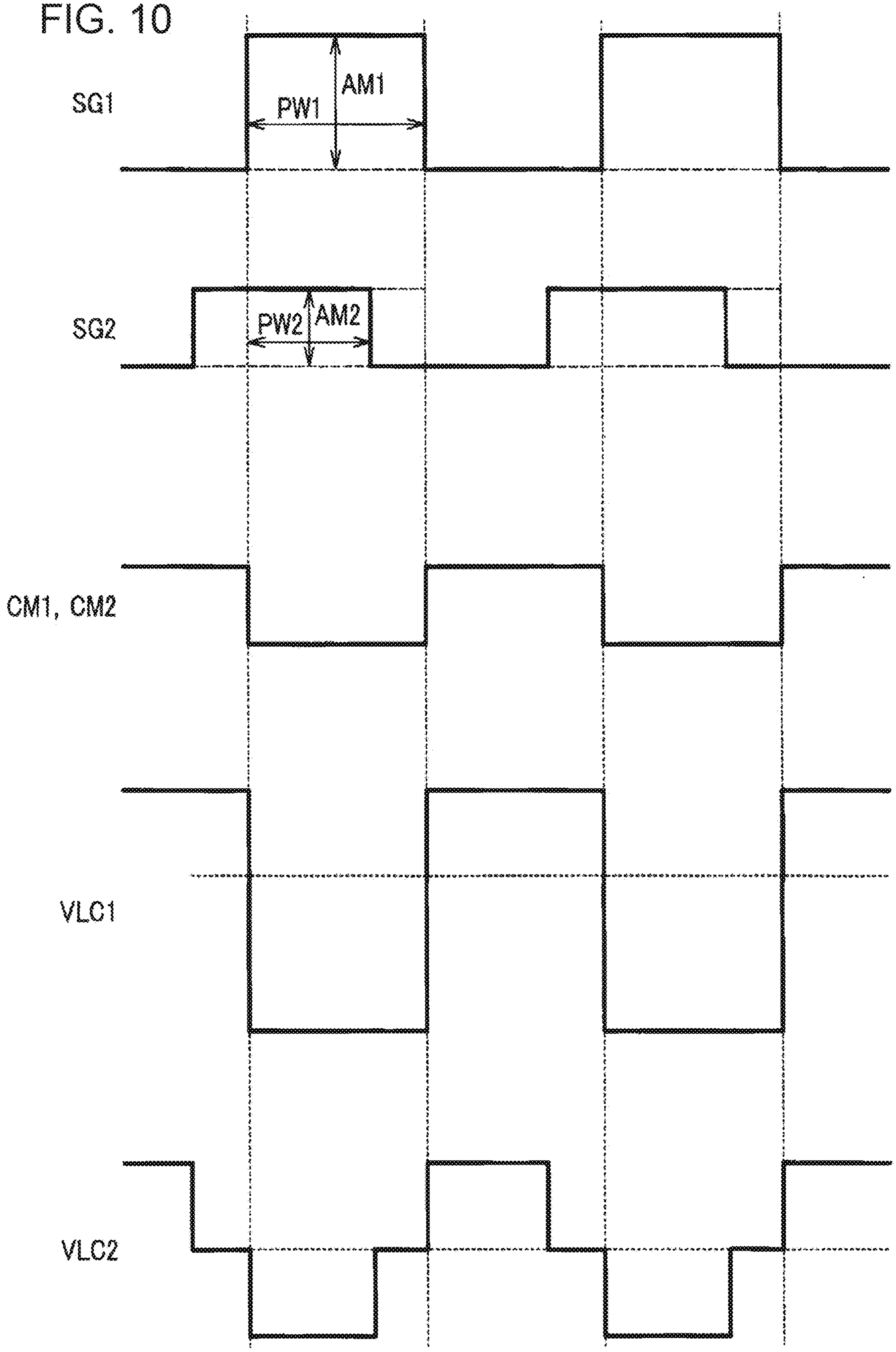
FIG. 10 illustrates an example of a signal waveform of driving that increases a voltage amplitude of a first drive signal.

When the gradation display of the display item other than the warning light is performed using the PWM signal as illustrated in FIG. 10, the voltage amplitude AM1 of the first drive signal SG1 may be higher than the voltage amplitude AM2 of the second drive signal SG2 that is the PWM signal. For example, in FIG. 10, the second drive signal SG2 for driving the second segment electrode EL2 is the PWM signal whose pulse width PW2 changes based on the gradation data. The voltage amplitude AM1 of the first drive signal SG1 for driving the first segment electrode EL1 of the warning light is higher than the voltage amplitude AM2 of the second drive signal SG2 that is the PWM signal. The pulse width PW1 of the first drive signal SG1 is larger than the pulse width PW2 of the second drive signal SG2 that is the PWM signal. In this case, the effective voltage of the voltage signal VLC1 applied to the liquid crystal of the first segment electrode EL1 can be much higher than the effective voltage of the voltage signal VLC1 in FIG. 8 described as normal PWM driving. Therefore, the warning light corresponding to the first segment electrode EL1 can be displayed with a higher contrast.

The driver 10 of the present embodiment further includes the data storage circuit 50 that stores the on/off data of the warning light for generating the first drive signal SG1 and the gradation data of the display item for generating the second drive signal SG2 as illustrated in FIG. 3. For example, the interface circuit 80 receives the on/off data of the warning light and the gradation data of the display item from the processing device 300, and the control circuit 60 writes the received on/off data of the warning light and the received gradation data of the display item to the data storage circuit 50 that is a RAM. The on/off data of the warning light from the data storage circuit 50 is input to the first segment drive circuit 21 via the data latch 41, and the gradation data of the display item from the data storage circuit 50 is input to the second segment drive circuit 22 via the data latch 42. When the on/off data indicates the on display, the first segment drive circuit 21 outputs the first drive signal SG11 as illustrated in FIG. 5, or outputs the first drive signal SG1 as illustrated in FIGS. 8, 9, and 10. When the on/off data indicates the off display, the first segment drive circuit 21 outputs the first drive signal SG12 as illustrated in FIG. 5. The second segment drive circuit 22 outputs the second drive signals SG21 and SG22 as illustrated in FIG. 6 based on the gradation data of the display item, or outputs the second drive signal SG2 as illustrated in FIGS. 8, 9, and 10. In this case, it is possible to display the warning light with a high contrast based on the on/off data of the warning light stored in the data storage circuit 50, and to perform the gradation display of the display item based on the gradation data of the display item stored in the data storage circuit 50.

As illustrated in FIG. 3, the driver 10 includes the first terminal TS1 through which the first drive signal SG1 is output and which is coupled to the first segment electrode EL1 of the liquid crystal panel 100, and the second terminal TS2 through which the second drive signal SG2 is output and which is coupled to the second segment electrode EL2 of the liquid crystal panel 100. The first terminal TS1 and the second terminal TS2 are, for example, the pads of the driver 10. For example, the first terminal TS1 is coupled to the first segment electrode EL1 via a coupling wiring or the segment line of the liquid crystal panel 100, and the second terminal TS2 is coupled to the second segment electrode EL2 via a coupling wiring or the segment line of the liquid crystal panel 100. The first terminal TS1 and the second terminal TS2 are disposed, for example, along a long side of the driver 10 in plan view. When such a first terminal TS1 is provided, the first drive signal SG1 from the first segment drive circuit 21 can be input to the first segment electrode EL1 via the first terminal TS1, so that the warning light corresponding to the first segment electrode EL1 can be driven with a high contrast. In addition, the second drive signal SG2 from the second segment drive circuit 22 can be input to the second segment electrode EL2 via the second terminal TS2, so that the gradation display of the display item corresponding to the second segment electrode EL2 can be performed.

4. Layout and Backlight

Figure 11:
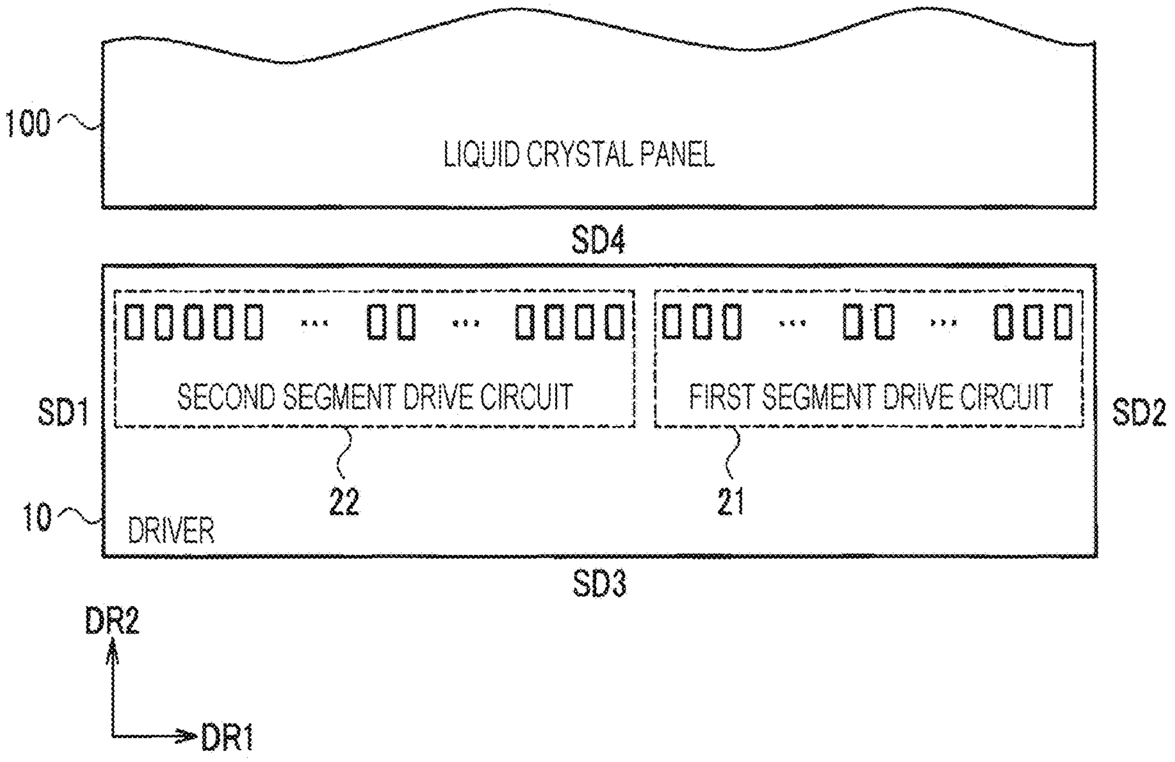
FIG. 11 illustrates an example of a layout of the first segment drive circuit and the second segment drive circuit.

FIG. 11 illustrates an example of a layout of the first segment drive circuit 21 and the second segment drive circuit 22 in the driver 10. In FIG. 11, the driver 10, which is a semiconductor IC, has sides SD1 and SD2 that are short sides and sides SD3 and SD4 that are long sides in plan view. The side SD2 is a side opposite to the side SD1, and the side SD4 is a side opposite to the side SD3. A direction along the long sides SD4 and SD3 is a first direction DR1, and a direction perpendicular to the first direction DR1 is a second direction DR2. The second direction DR2 is a direction along the short sides SD1 and SD2. For example, the first direction DR1 is a direction from the side SD1 to the side SD2 that is a side opposite to the side SD1. The second direction DR2 is a direction from the side SD3 to the side SD4 that is a side opposite to the side SD3. A shape of the driver 10 in plan view may be a substantially quadrilateral, and may have chamfered portions at corners of the quadrilateral, for example.

When a long side direction of the driver 10 is the first direction DR1 as described above, the first segment drive circuit 21 and the second segment drive circuit 22 are arranged in the first direction DR1. For example, in FIG. 11, the first segment drive circuit 21 and the second segment drive circuit 22 are arranged next to each other in the first direction DR1. In this case, the first segment drive circuit 21 is disposed in a first region along the long side direction of the driver 10, and the second segment drive circuit 22 is disposed in a second region along the long side direction of the driver 10. As a result, the first segment drive circuit 21 for the warning light and the second segment drive circuit 22 for the display item other than the warning light are disposed in different regions such as the first region and the second region, so that the warning light can be displayed with a high contrast by the first segment drive circuit 21, and the gradation display of the display item other than the warning light can be performed by the second segment drive circuit 22.

Figure 12:
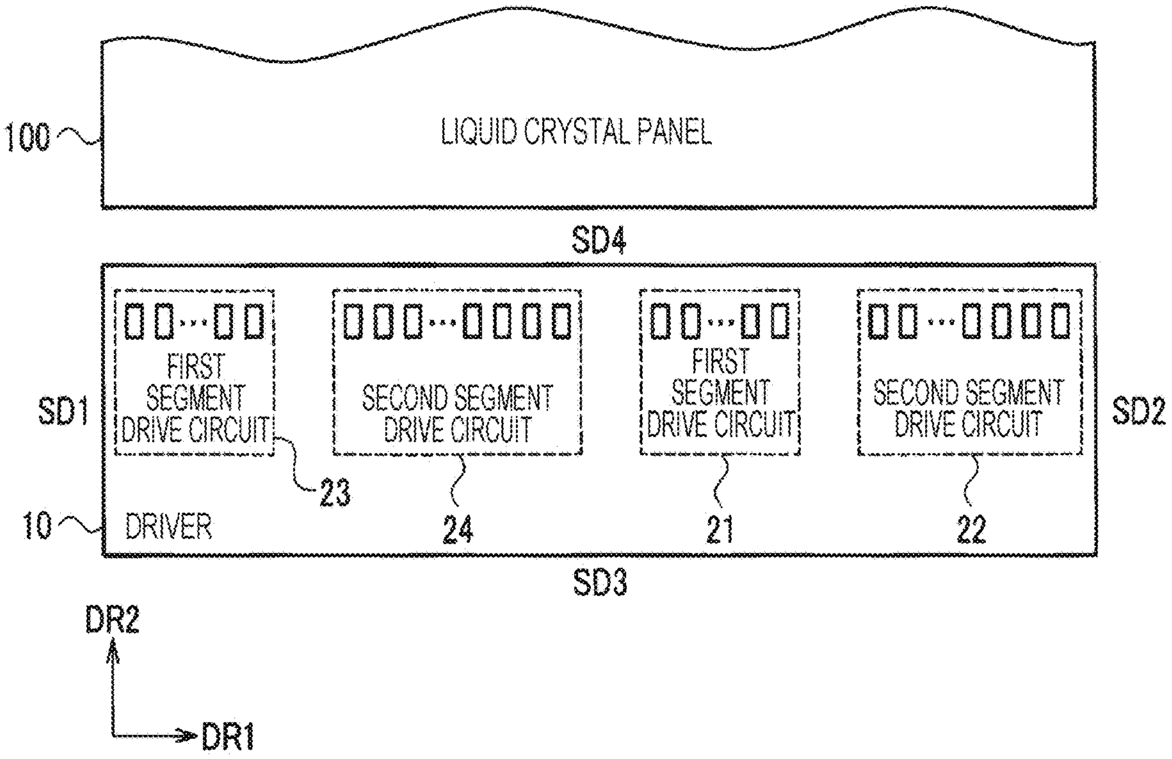
FIG. 12 illustrates an example of the layout of the first segment drive circuit and the second segment drive circuit.

In FIG. 12, a plurality of first segment drive circuits 21 and 23 and a plurality of second segment drive circuits 22 and 24 are provided. In FIG. 12, the first segment drive circuit 21 and the second segment drive circuit 22 are arranged in the first direction DR1, and the first segment drive circuit 23 and the second segment drive circuit 24 are arranged in the first direction DR1. FIG. 12 illustrates a case where two first segment drive circuits 21 and 23 and two second segment drive circuits 22 and 24 are provided, but three or more first segment drive circuits or three or more second segment drive circuits may be provided.

In addition, at least one of the first common drive circuit 31 or the second common drive circuit 32 described in FIG. 3 may be disposed between the first segment drive circuit 21 and the second segment drive circuit 22, between the first segment drive circuit 23 and the second segment drive circuit 24, or between the first segment drive circuit 21 and the second segment drive circuit 24. Further, each terminal of the driver 10 may be switched between being coupled to the first segment drive circuit and being coupled to the second segment drive circuit under the control of the control circuit 60 of FIG. 3. For example, when the external processing device 300 issues a command for terminal switching setting, the control circuit 60 may perform switching between coupling of each terminal of the driver 10 to the first segment drive circuit and coupling of each terminal of the driver 10 to the second segment drive circuit based on the command.

Figure 13:
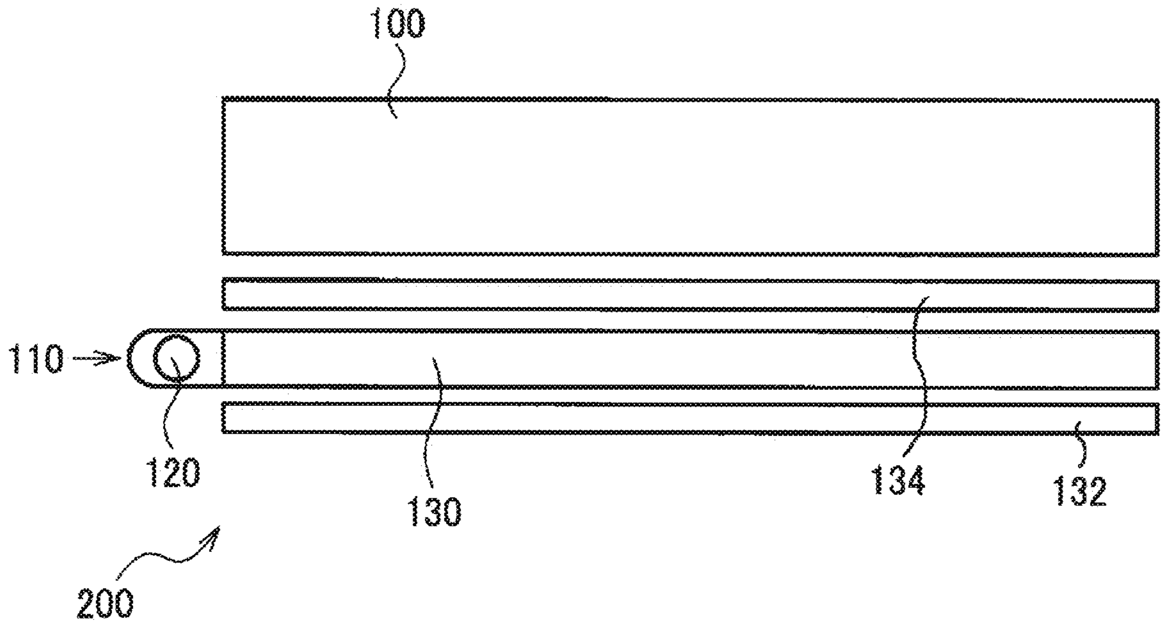
FIG. 13 illustrates an example of a configuration of the electro-optical device including a backlight that includes a light source and a light guide plate.

As illustrated in FIGS. 1 and 3, the electro-optical device 200 of the present embodiment includes the driver 10 and the liquid crystal panel 100. Therefore, it is possible to display the display item other than the warning light while displaying the warning light with a high contrast on the liquid crystal panel 100. As illustrated in FIG. 13, the electro-optical device 200 includes a backlight 110. In FIG. 13, the backlight 110 includes a light guide plate 130 and a light source 120 provided on at least one side of the light guide plate 130. The light source 120 is implemented by, for example, an LED element or a cold cathode tube. For example, the backlight 110 may be of a type called an edge light type or a side light type. FIG. 13 illustrates a side view of the electro-optical device 200, and the light source 120 is provided, for example, on one side of the light guide plate 130 in plan view of the electro-optical device 200. In this case, a plurality of light sources 120 may be arranged on one side of the light guide plate 130. Alternatively, the light sources 120 may be provided on a first side of the light guide plate 130 and a second side of the light guide plate 130 that is opposite to the first side. The light guide plate 130, which is a light guide sheet, is implemented by, for example, an acrylic plate. A diffusion plate 134, which is, for example, a diffusion sheet, is provided between the light guide plate 130 and the liquid crystal panel 100. A reflection plate 132, which is, for example, a reflection sheet, is provided on a surface of the light guide plate 130 that is opposite to the liquid crystal panel 100. By providing the backlight 110 as illustrated in FIG. 13, light from the light source 120 can be guided by the light guide plate 130, and the guided light can be substantially uniformly incident on the liquid crystal panel 100 from a back side of the liquid crystal panel 100.

In the backlight 110 of the type as illustrated in FIG. 13, light from the backlight 110 is substantially uniformly emitted from the back side of the liquid crystal panel 100, and thus, it is difficult to display the warning light with a high contrast by controlling the backlight 110. In this regard, in the present embodiment, the first segment drive circuit 21 dedicated to the warning light is provided, and the driving method for the first drive signal SG1 from the first segment drive circuit 21 is devised to drive the first segment electrode EL1 corresponding to the warning light. In this case, even when the backlight 110 of the type as illustrated in FIG. 13 is used, it is possible to provide the electro-optical device 200 that can display the warning light with a higher contrast than other display items.

As described above, the driver of the present embodiment is a driver that drives the segment electrode group of the liquid crystal panel, and includes the first segment drive circuit that drives the first segment electrode for displaying the warning light in the segment electrode group, and the second segment drive circuit that drives the second segment electrode for displaying the display item other than the warning light in the segment electrode group. The first segment drive circuit outputs the first drive signal for displaying the warning light displayed by the first segment electrode with a higher contrast than the display item displayed by the second segment electrode driven by the second drive signal of the second segment drive circuit.

According to the present embodiment, the first segment drive circuit that drives the first segment electrode for displaying the warning light and the second segment drive circuit that drives the second segment electrode for displaying the display item other than the warning light are separately provided. When the first segment drive circuit for the warning light is provided in this manner, the warning light is displayed with a higher contrast than the display item other than the warning light by the first drive signal of the first segment drive circuit. As a result, it possible to ensure the visibility of the warning light even when the warning light is displayed using the liquid crystal panel. Therefore, it is possible to provide the driver or the like that can display the display item other than the warning light on the liquid crystal panel and can display the warning light on the liquid crystal panel with higher visibility than the display item.

In the present embodiment, the first segment drive circuit may drive the first segment electrode by using the first drive signal for the static driving, and the second segment drive circuit may drive the second segment electrode by using the second drive signal for the duty driving.

By driving the first segment electrode using the first drive signal for the static driving in this way, the warning light corresponding to the first segment electrode can be displayed with a higher contrast than the display item corresponding to the second segment electrode driven by the second drive signal for the duty driving.

In the present embodiment, the first segment drive circuit may output the first drive signal for turning on or off the warning light to the first segment electrode based on the on/off data of the warning light.

In this case, the first segment drive circuit can output the first drive signal for turning on or off the warning light to the first segment electrode based on the on/off data of the warning light. Further, the first segment drive circuit outputs the first drive signal for the static driving, so that the warning light can be displayed with a high contrast.

In the present embodiment, the driver may further include the first common drive circuit that drives the first common electrode corresponding to the first segment electrode, and the second common drive circuit that drives the second common electrode corresponding to the second segment electrode.

In this case, even when the driving method for the first segment electrode and the driving method for the second segment electrode are different from each other, the first common drive circuit and the second common drive circuit can output the common drive signals appropriate for the respective driving methods.

The first segment drive circuit may drive the first segment electrode by using the first drive signal for the static driving, and the second segment drive circuit may drive the second segment electrode by using the second drive signal for the static driving. The first segment drive circuit may output the first drive signal for turning on or off the warning light to the first segment electrode based on the on/off data of the warning light, and the second segment drive circuit may output the second drive signal for performing the gradation display of the display item to the second segment electrode based on the gradation data of the display item.

In this case, for the warning light, the static driving for the first segment electrode is performed using the first drive signal based on the on/off data of the warning light, so that the warning light can be displayed with a high contrast. On the other hand, for the display item other than the warning light, the static driving for the second segment electrode is performed using the second drive signal based on the gradation data, so that the gradation display of the display item can be performed.

The second segment drive circuit may perform the gradation display of the display item displayed by the second segment electrode by using the second drive signal that is the PWM signal.

In this case, the warning light can be displayed with a high contrast by the static driving based on the on/off data of the warning light, and the gradation display of the display item other than the warning light can be implemented by the static driving using the PWM signal based on the gradation data.

In the present embodiment, the voltage amplitude of the first drive signal may be higher than the voltage amplitude of the PWM signal.

In this case, the effective voltage applied to the liquid crystal of the first segment electrode can be further increased, so that it is possible to display the warning light corresponding to the first segment electrode with a higher contrast.

In the present embodiment, the second segment drive circuit may perform the gradation display of the display item displayed by the second segment electrode by using the second drive signal that is the PAM signal.

In this case, the warning light can be displayed with a high contrast by the static driving based on the on/off data of the warning light, and the gradation display of the display item other than the warning light can be implemented by the static driving using the PAM signal based on the gradation data.

In the present embodiment, the driver may include the data storage circuit that stores the on/off data of the warning light for generating the first drive signal and the gradation data of the display item for generating the second drive signal.

In this case, it is possible to display the warning light with a high contrast based on the on/off data of the warning light stored in the data storage circuit, and to perform the gradation display of the display item based on the gradation data of the display item stored in the data storage circuit.

In the present embodiment, the driver may include the first terminal through which the first drive signal is output and which is coupled to the first segment electrode of the liquid crystal panel, and the second terminal through which the second drive signal is output and which is coupled to the second segment electrode of the liquid crystal panel.

In this case, the first drive signal from the first segment drive circuit can be input to the first segment electrode via the first terminal, so that the warning light corresponding to the first segment electrode can be driven with a high contrast. Further, the second drive signal from the second segment drive circuit can be input to the second segment electrode via the second terminal, so that the display item corresponding to the second segment electrode can be displayed.

In the present embodiment, when the long side direction of the driver is the first direction, the first segment drive circuit and the second segment drive circuit may be arranged in the first direction.

In this case, the first segment drive circuit for the warning light and the second segment drive circuit for the display item other than the warning light are disposed in different regions, so that the warning light can be displayed with a high contrast by the first segment drive circuit, and the display of the display item other than the warning light can be performed by the second segment drive circuit.

The present embodiment relates to the electro-optical device including the above-described driver and the liquid crystal panel.

With the electro-optical device as described above, it is possible to display the display item other than the warning light while displaying the warning light with a high contrast on the liquid crystal panel.

In the present embodiment, the electro-optical device may include the backlight including the light guide plate and the light source provided on at least one side of the light guide plate.

By providing such a backlight, light from the light source can be guided by the light guide plate, and the guided light can be substantially uniformly incident on the liquid crystal panel from the back side of the liquid crystal panel.

Although the present embodiment has been described in detail as above, those skilled in the art will easily understand that many modifications can be made without substantively departing from the novelty and effects of the present disclosure. Therefore, all such modifications are intended to be included within the scope of the present disclosure. For example, a term that appears at least once in the specification or drawings together with a different term with a broader or synonymous meaning may be replaced by that different term anywhere in the specification or drawings. Further, all combinations of the present embodiment and modifications also fall within the scope of the present disclosure. Further, the configuration, operation, and the like of the driver, the electro-optical device, the liquid crystal panel, and the like are not limited to those described in the present embodiment, and various modifications are possible.

What is claimed is:

1. A driver that drives a segment electrode group of a liquid crystal panel, the driver comprising:

a first segment drive circuit that drives a first segment electrode for displaying a warning light in the segment electrode group; and a second segment drive circuit that drives a second segment electrode for displaying a display item other than the warning light in the segment electrode group, wherein the first segment drive circuit outputs a first drive signal for displaying the warning light displayed by the first segment electrode with a higher contrast than the display item displayed by the second segment electrode driven by a second drive signal of the second segment drive circuit.

2. The driver according to claim 1, wherein the first segment drive circuit drives the first segment electrode by using the first drive signal for static driving, and the second segment drive circuit drives the second segment electrode by using the second drive signal for duty driving.

3. The driver according to claim 2, wherein the first segment drive circuit outputs the first drive signal for turning on or off the warning light to the first segment electrode based on on/off data of the warning light.

4. The driver according to claim 1, further comprising:

a first common drive circuit that drives a first common electrode corresponding to the first segment electrode; and a second common drive circuit that drives a second common electrode corresponding to the second segment electrode.

5. The driver according to claim 1, wherein the first segment drive circuit drives the first segment electrode by using the first drive signal for static driving, the second segment drive circuit drives the second segment electrode by using the second drive signal for the static driving, the first segment drive circuit outputs the first drive signal for turning on or off the warning light to the first segment electrode based on on/off data of the warning light, and the second segment drive circuit outputs the second drive signal for performing gradation display of the display item to the second segment electrode based on gradation data of the display item.

6. The driver according to claim 5, wherein the second segment drive circuit performs the gradation display of the display item displayed by the second segment electrode by using the second drive signal that is a pulse width modulation (PWM) signal.

7. The driver according to claim 6, wherein a voltage amplitude of the first drive signal is higher than a voltage amplitude of the PWM signal.

8. The driver according to claim 5, wherein the second segment drive circuit performs the gradation display of the display item displayed by the second segment electrode by using the second drive signal that is a pulse amplitude modulation (PAM) signal.

9. The driver according to claim 1, further comprising a data storage circuit that stores on/off data of the warning light for generating the first drive signal and gradation data of the display item for generating the second drive signal.

10. The driver according to claim 1, further comprising:

a first terminal through which the first drive signal is output and which is coupled to the first segment electrode of the liquid crystal panel; and a second terminal through which the second drive signal is output and which is coupled to the second segment electrode of the liquid crystal panel.

11. The driver according to claim 1, wherein when a long side direction of the driver is a first direction, the first segment drive circuit and the second segment drive circuit are arranged in the first direction.

12. An electro-optical device comprising:

the driver according to claim 1; and the liquid crystal panel.

13. The electro-optical device according to claim 12, further comprising a backlight including a light guide plate and a light source provided on at least one side of the light guide plate.

* * * * *